United States Patent
Wang et al.

(10) Patent No.: US 11,623,182 B2
(45) Date of Patent: Apr. 11, 2023

(54) NANOFILTRATION MEMBRANE WITH HIGH FLUX FOR SELECTIVELY REMOVING HYDROPHOBIC ENDOCRINE DISRUPTING CHEMICALS AND PREPARATION METHOD THEREOF

(71) Applicants: Tongji University, Shanghai (CN); Tianjin Polytechnic University, Tianjin (CN)

(72) Inventors: Zhiwei Wang, Tianjin (CN); Ruobin Dai, Tianjin (CN); Hongwei Zhang, Tianjin (CN); Liang Wang, Tianjin (CN); Qiaoying Wang, Tianjin (CN); Zhichao Wu, Tianjin (CN)

(73) Assignees: TONGJI UNIVERSITY, Shanghai (CN); TIANJIN POLYTECHNIC UNIVERSITY, Tianjin (CN)

( * ) Notice: Subject to any disclaimer, the term of this patent is extended or adjusted under 35 U.S.C. 154(b) by 333 days.

(21) Appl. No.: 16/908,670

(22) Filed: Jun. 22, 2020

(65) Prior Publication Data

US 2020/0406199 A1    Dec. 31, 2020

(30) Foreign Application Priority Data

Jun. 25, 2019 (CN) .......................... 201910552976.2

(51) Int. Cl.
  *B01D 67/00*  (2006.01)
  *B01D 61/02*  (2006.01)
  (Continued)

(52) U.S. Cl.
  CPC ....... *B01D 67/0006* (2013.01); *B01D 61/027* (2013.01); *B01D 69/02* (2013.01);
  (Continued)

(58) Field of Classification Search
  CPC B01D 29/00; B01D 29/0002; B01D 29/0093; B01D 29/0095; B01D 29/01;
  (Continued)

(56) References Cited

U.S. PATENT DOCUMENTS

| 2008/0135482 A1* | 6/2008 | Singh ................... B01D 61/027 210/651 |
| 2009/0126567 A1* | 5/2009 | Liu ....................... B01D 69/148 210/500.21 |

(Continued)

FOREIGN PATENT DOCUMENTS

| CN | 105617875 A | 6/2016 |
| CN | 108409981 A | 8/2018 |

OTHER PUBLICATIONS

Materials 2016, 9, 870; doi:10.3390/ma9110870 (Year: 2016).*

(Continued)

*Primary Examiner* — Allison G Fitzsimmons
(74) *Attorney, Agent, or Firm* — Bayramoglu Law Offices LLC

(57) ABSTRACT

A nanofiltration membrane with a high flux for selectively removing hydrophobic endocrine disrupting chemicals and a preparation method thereof are provided. The method includes the following steps: immersing a porous support layer into a first solution, removing excess droplets from a surface of the support layer after taking the support layer out of the first solution, and then immersing the support layer attached with the first solution into a second solution for an interfacial polymerization reaction, followed by washing after completion of the reaction to obtain the subject nanofiltration membrane. The first solution is an aqueous solution containing a polyamine monomer and an acid binding agent, and the second solution is an organic solution containing an acid chloride monomer and a metal-organic framework.

20 Claims, 4 Drawing Sheets

(51) Int. Cl.
*B01D 69/02* (2006.01)
*B01D 69/10* (2006.01)
*B01D 69/12* (2006.01)
*B01D 71/60* (2006.01)
*C02F 1/44* (2023.01)
*B01D 71/56* (2006.01)
*B01D 71/02* (2006.01)
*B01J 13/16* (2006.01)
*C02F 101/30* (2006.01)

(52) U.S. Cl.
CPC ......... *B01D 69/105* (2013.01); *B01D 69/125* (2013.01); *B01D 71/02* (2013.01); *B01D 71/56* (2013.01); *B01D 71/60* (2013.01); *C02F 1/442* (2013.01); *B01D 2323/40* (2013.01); *B01D 2325/36* (2013.01); *C02F 2101/305* (2013.01)

(58) Field of Classification Search
CPC .. B01D 29/012; B01D 39/14; B01D 39/1692; B01D 63/08; B01D 63/081; B01D 63/082; B01D 67/00; B01D 67/0002; B01D 67/0006; B01D 67/0009; B01D 67/0011; B01D 67/0013; B01D 67/0016; B01D 67/0018; B01D 67/0079; B01D 67/00791; B01D 67/0081; B01D 67/0088; B01D 67/0093; B01D 67/00931; B01D 67/00933; B01D 69/00; B01D 69/06; B01D 69/10; B01D 69/105; B01D 69/106; B01D 71/022; B01D 71/06; B01D 71/60; B01D 71/601; B01D 2221/00; B01D 2221/02; B01D 2221/12; B01D 2239/10; B01D 2257/93; B01D 2323/00; B01D 2323/04; B01D 2323/28; B01D 2323/30; B01D 2323/40; B01D 2323/42; C02F 1/00; C02F 1/001; C02F 1/26; C02F 1/58; C02F 2101/00; C02F 2101/30; C02F 2101/305; C02F 2201/00; C02F 2201/002; C02F 2209/0036; B01J 13/16; B01J 13/14; B01J 13/18; B01J 13/185

See application file for complete search history.

(56) References Cited

U.S. PATENT DOCUMENTS

2011/0005997 A1* 1/2011 Kurth .................. B01D 71/56
977/773
2012/0241371 A1* 9/2012 Revanur ............... B82Y 40/00
210/488

OTHER PUBLICATIONS

Hao Guo, et al., Does Hydrophilic Polydopamine Coating Enhance Membrane Rejection of Hydrophobic Endocrine-Disrupting Compounds?, Environmental Science & Technology Letters, 2016, pp. 332-338, 3(9).

Hao Guo, et al., A One-Step Rapid Assembly of Thin Film Coating Using Green Coordination Complexes for Enhanced Removal of Trace Organic Contaminants by Membranes, Environmental Science & Technology, 2017, pp. 12638-12643, 51(21).

* cited by examiner

NANOFILTRATION MEMBRANE WITH HIGH FLUX FOR SELECTIVELY REMOVING HYDROPHOBIC ENDOCRINE DISRUPTING CHEMICALS AND PREPARATION METHOD THEREOF

CROSS REFERENCE TO THE RELATED APPLICATIONS

This application is based upon and claims priority to Chinese Patent Application No. 201910552976.2, filed on Jun. 25, 2019, the entire contents of which are incorporated herein by reference.

TECHNICAL FIELD

The present invention relates to a nanofiltration membrane and a preparation method thereof, more specifically to a nanofiltration membrane with a high flux for selectively removing hydrophobic endocrine disrupting chemicals and a preparation method thereof, and belongs to the field of membrane separation technology.

BACKGROUND

The separation process based on polyamide nanofiltration membranes and reverse osmosis membranes is indispensable in water reuse. Although most of pollutants (such as macromolecular organics, inorganic salts and the like) in sewage can be rejected by the nanofiltration membranes and reverse osmosis membranes, their rejection performance for common hydrophobic organic micro-pollutants (represented by endocrine disrupting chemicals (EDCs)) in water reuse is not desirable. Due to the hydrophobic interaction of EDCs with the surface of traditional polyamide membranes, the rejection rate of EDCs by common nanofiltration/reverse osmosis membranes is even lower than 20%. In view of the fact that the environmental concentration of EDCs may cause serious harm to human endocrine and developmental systems, it is imperative to improve the rejection of EDCs by the nanofiltration/reverse osmosis membranes in water reuse.

Hydrophilic coating on the surface of the polyamide membrane can reduce the adsorption of EDCs on the surface of the membrane, thereby reducing the total amount of EDCs permeating the membrane. It is reported that methods, such as those for coating with polydopamine or preparing a tannic acid-iron composite coating, are effective in improving the rejection rate of EDCs by the nanofiltration membranes (Environmental science & technology, 2017, 51(21): 12638-12643.). However, the hydrophilic coating on the surface will increase the thickness of the rejection layer, thereby increasing the resistance of water molecules to permeate through the membrane, which results in a decrease in the water flux of the membrane. For example, coating on the surface of a commercial NF90 membrane with polydopamine for 4 hours will cause a decrease of 40% in the water flux of the membrane (Environmental Science & Technology Letters, 2016, 3(9): 332-338.). In addition, the decrease of water flux will directly increase the pressure required for water to permeate through the membrane during water reuse, which significantly increases the energy consumption of the system. Therefore, it is necessary to develop a method for not only improving rejection rate of endocrine disrupting chemicals by nanofiltration membranes, but also improving the water flux.

SUMMARY

In view of the problems in the prior art, the present invention provides a nanofiltration membrane with a high flux for selectively removing hydrophobic endocrine disrupting chemicals and a preparation method thereof. The preparation method is facile, and the nanofiltration membrane prepared by the preparation method not only has an increased rejection rate of the hydrophobic endocrine disrupting chemicals, but also has a greatly increased water flux, and thus, has an effectively improved selectivity for water/endocrine disrupting chemicals.

In order to achieve the above technical objectives, the present invention provides the technical solutions as follows.

The present invention provides a method for preparing a nanofiltration membrane with a high flux for selectively removing hydrophobic endocrine disrupting chemicals, including the following steps: immersing a porous support layer into a first solution, removing excess droplets from a surface of the porous support layer after taking the porous support layer out, and then immersing the porous support layer attached with the first solution into a second solution for an interfacial polymerization reaction, followed by washing after completion of the reaction to obtain the subject nanofiltration membrane, wherein the first solution is an aqueous solution containing a polyamine monomer and an acid binding agent, and the second solution is an organic solution containing an acid chloride monomer and a metal-organic framework.

Preferably, the metal-organic framework has a pore size ranging from 0.7 nm to 2.0 nm, a metal center which is aluminum, chromium or iron, and a ligand which is an organic ligand containing a carboxyl group.

Further preferably, the ligand is terephthalic acid or 2-aminoterephthalic acid.

Preferably, the metal-organic framework is any one or more selected from the group consisting of MIL-101(Cr), MIL-101(Al), MIL-53(Cr), and MIL-53(Al), and has a mass/volume percentage concentration of 0.02 wt/v % to 0.40 wt/v % in the second solution.

Preferably, the polyamine monomer is any one or more selected from the group consisting of piperazine, m-phenylenediamine and p-phenylenediamine, and has a mass percentage concentration of 0.5 wt % to 2.0 wt % in the first solution.

Preferably, the acid binding agent is a mixture of triethylamine and sodium hydroxide, and has a total mass percentage concentration of 0.2 wt % to 1.0 wt % in the first solution, wherein the triethylamine and the sodium hydroxide are present at a concentration ratio of 2 to 5.

Preferably, the acid chloride monomer is any one or more selected from the group consisting of trimesoyl chloride and terephthaloyl chloride, and has a mass percentage concentration of 0.05 wt % to 0.3 wt % in the second solution.

Preferably, the second solution is formed by dissolving of the acid chloride monomer and the metal-organic framework in an organic solvent and ultrasonic blending, wherein the ultrasonic blending is performed with an ultrasonic intensity of 150 W to 500 W at a temperature of 10° C. to 40° C. for a time period of 0.5 to 2.0 hours.

Preferably, the post-treatment is specifically performed by drying the membrane in air for 1 to 3 minutes, and then soaking the membrane in n-hexane for 1 to 3 minutes, followed by soaking the membrane in water for 1 to 3 minutes.

The present invention provides a nanofiltration membrane prepared by the above preparation method.

From the above description, it can be seen that the present invention has the following advantages.

The preparation method according to the present invention is facile. In the preparation method, the hydrophilic and microporous metal-organic frameworks (MOFs) are introduced into the rejection layer of the nanofiltration membrane through the interfacial polymerization reaction, and by controlling the total mass concentration and ratio of the polyamine monomer, the acid chloride monomer and the metal-organic frameworks, the primary water transport channels on the surface of the nanofiltration membrane are concentrated on the MOFs, so that the overall separation performance of the membrane is dominated by the pores of the hydrophilic MOFs. Thereby, thanks to the hydrophilic nature of MOFs, the rejection rate of hydrophobic endocrine disrupting chemicals (EDCs) by the nanofiltration membrane is significantly improved, the water flux of the nanofiltration membrane is greatly increased, and thus, the selectivity of the nanofiltration membrane for water/EDCs is effectively improved, which makes it possible to effectively remove EDCs while ensuring the water recovery from the nanofiltration and the safety of the produced water.

DETAILED DESCRIPTION OF THE EMBODIMENTS

The features of the present invention are further described below with reference to embodiments, without any limitation on the claims of the present invention.

Embodiment 1

Piperazine, triethylamine and sodium hydroxide (NaOH) were added to deionized water and stirred until completely dissolved to form a first solution. The first solution contained the piperazine at a mass percentage concentration of 1.0 wt %, the triethylamine at a mass percentage concentration of 0.5 wt %, and the sodium hydroxide at a mass percentage concentration of 0.15 wt %.

MIL-101 (Cr) (Chemsoon Chemical Technology Co. Ltd., Shanghai; pore size: 1.2/1.6 nm) was added to a solution of trimesoyl chloride in n-hexane, and subjected to sonication with an ultrasonic intensity of 300 W at room temperature for 30 minutes to form a second solution dispersed uniformly. The second solution contained the MIL-101(Cr) at a mass/volume percentage concentration of 0.10 wt/v % and the trimesoyl chloride at a mass percentage concentration of 0.15 wt %.

A porous support layer was immersed into the first solution for 2 minutes and then taken out to remove excess droplets from a surface of the support layer with a filter paper. Subsequently, the support layer attached with the first solution was immersed into the second solution to perform an interfacial polymerization reaction for 30 seconds. Upon completion of the reaction, the obtained nanofiltration membrane was first dried in air for 2 minutes, then soaked in n-hexane for 1 minute, and then soaked in water for 1 minute, to obtain the subject nanofiltration membrane (nanofiltration membrane modified with 0.1 wt/v % MIL-101(Cr)).

Figure 1:
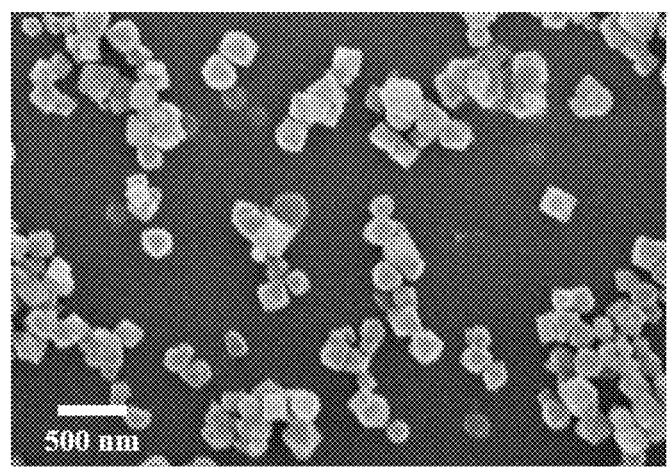
FIG. 1 shows a scanning electron microscope image of a nanofiltration membrane prepared in Embodiment 1.

FIG. 1 shows a scanning electron microscope image of the nanofiltration membrane prepared above. From the FIG. 1, it can be seen that MIL-101(Cr) has been successfully loaded on the surface of the nanofiltration membrane.

Embodiment 2

A nanofiltration membrane (nanofiltration membrane modified with 0.2 wt/v % MIL-101(Cr)) was prepared by the same method as in Embodiment 1, except that the concentration of MIL-101(Cr) dispersed in the second solution was adjusted to 0.20 wt/v %.

Figure 2:
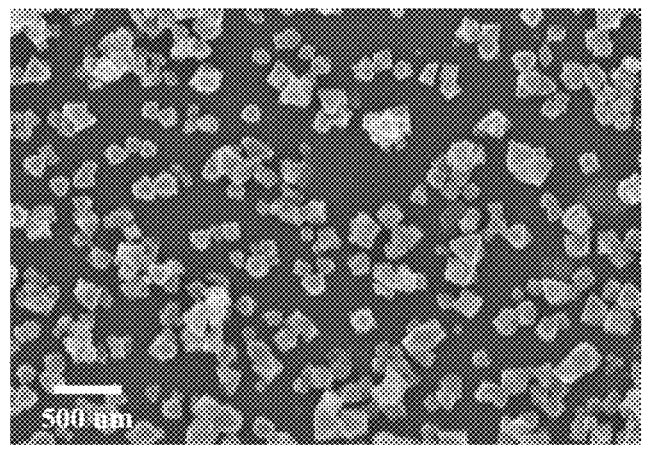
FIG. 2 shows a scanning electron microscope image of a nanofiltration membrane prepared in Embodiment 2.

FIG. 2 shows a scanning electron microscope image of the nanofiltration membrane prepared above. From the FIG. 2, it can be seen that MIL-101(Cr) has been successfully loaded on the surface of the nanofiltration membrane.

Embodiment 3

A nanofiltration membrane (nanofiltration membrane modified with 0.2 wt/v % MIL-53(Cr)) was prepared by the same method as in Embodiment 2, except that MIL-53(Cr) (Chemsoon Chemical Technology Co. Ltd., Shanghai; pore size: 0.82 nm) was used in place of MIL-101(Cr).

Embodiment 4

M-phenylenediamine, triethylamine and sodium hydroxide (NaOH) were added to deionized water and stirred until completely dissolved to form a first solution. The first solution contained the m-phenylenediamine at a mass percentage concentration of 0.5 wt %, the triethylamine at a mass percentage concentration of 0.20 wt %, and the sodium hydroxide at a mass percentage concentration of 0.10 wt %.

MIL-101(Cr)(Chemsoon Chemical Technology Co. Ltd., Shanghai; pore size: 1.2/1.6 nm) was added to a solution of trimesoyl chloride in n-hexane, and subjected to sonication with an ultrasonic intensity of 300 W at room temperature for 30 minutes to form a second solution dispersed uniformly. The second solution contained the MIL-101(Cr) at a mass/volume percentage concentration of 0.02 wt/v % and the trimesoyl chloride at a mass percentage concentration of 0.05 wt %.

A porous support layer was immersed into the first solution for 2 minutes and then taken out to remove excess droplets from a surface of the support layer with a filter paper. Subsequently, the support layer attached with the first solution was immersed into the second solution to perform an interfacial polymerization reaction for 30 seconds. Upon completion of the reaction, the obtained nanofiltration membrane was first dried in air for 2 minutes, then soaked in n-hexane for 1 minute, and then soaked in water for 1 minute, to obtain the subject nanofiltration membrane (nanofiltration membrane modified with 0.02 wt/v % MIL-101(Cr)).

Embodiment 5

P-phenylenediamine, triethylamine and sodium hydroxide (NaOH) were added to deionized water and stirred until completely dissolved to form a first solution. The first solution contained the p-phenylenediamine at a mass percentage concentration of 2 wt %, the triethylamine at a mass percentage concentration of 0.75 wt %, and the sodium hydroxide at a mass percentage concentration of 0.15 wt %.

MIL-101(Cr)(Chemsoon Chemical Technology Co. Ltd., Shanghai; pore size: 1.2/1.6 nm) was added to a solution of terephthaloyl chloride in n-hexane, and subjected to sonication with an ultrasonic intensity of 300 W at room temperature for 30 minutes to form a second solution dispersed uniformly. The second solution contained the MIL-101(Cr) at a mass/volume percentage concentration of 0.4 wt/v % and the terephthaloyl chloride at a mass percentage concentration of 2 wt %.

A porous support layer was immersed into the first solution for 2 minutes and then taken out to remove excess droplets from a surface of the support layer with a filter paper. Subsequently, the support layer attached with the first solution was immersed into the second solution to perform an interfacial polymerization reaction for 30 seconds. Upon completion of the reaction, the obtained nanofiltration membrane was first dried in air for 2 minutes, then soaked in n-hexane for 1 minute, and then soaked in water for 1 minute, to obtain the subject nanofiltration membrane (nanofiltration membrane modified with 0.4 wt/v % MIL-101 (Cr)).

Comparative Example 1

Piperazine, triethylamine and sodium hydroxide (NaOH) were added to deionized water and stirred until completely dissolved to form a first solution. The first solution contained the piperazine at a mass percentage concentration of 1.0 wt %, the triethylamine at a mass percentage concentration of 0.5 wt %, and the sodium hydroxide at a mass percentage concentration of 0.15 wt %.

Trimesoyl chloride was added to n-hexane and stirred until completely dissolved to form a second solution. The second solution contained the trimesoyl chloride at a mass percentage concentration of 0.15 wt %.

A porous support layer was immersed into the first solution for 2 minutes and then taken out to remove excess droplets from a surface of the support layer with a filter paper. Subsequently, the support layer attached with the first solution was immersed into the second solution to perform an interfacial polymerization reaction for 30 seconds. Upon completion of the reaction, the obtained nanofiltration membrane was first dried in air for 2 minutes, then soaked in n-hexane for 1 minute, and then soaked in water for 1 minute.

Figure 3:
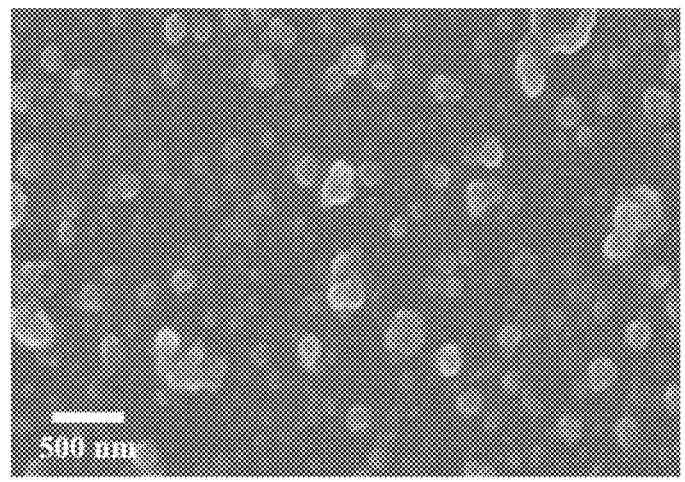
FIG. 3 shows a scanning electron microscope image of a nanofiltration membrane prepared in Comparative Example 1.

FIG. 3 shows a scanning electron microscope image of the nanofiltration membrane prepared above. From the FIG. 3, it can be seen that the surface of the nanofiltration membrane has a flat and typical polyamide nanofiltration membrane structure, without MIL-101(Cr) loaded.

Comparative Example 2

A nanofiltration membrane (nanofiltration membrane modified with 0.2 wt/v % UiO-66) was prepared by the same method as in Embodiment 2, except that UiO-66 (Chemsoon Chemical Technology Co. Ltd., Shanghai; pore size: 0.6 nm) was used in place of MIL-101(Cr).

Comparative Example 3

A composite nanofiltration membrane with a modified metal-organic framework was prepared by the method described in Embodiment 4 of the patent application with Publication Number CN108409981 A.

In order to test the filtration performance of the nanofiltration membranes prepared by the present invention, the inventors further conducted a series of experiments. Due to space limitations, only the most representative data from Experimental Examples is listed here.

Effect Test:

Sample 1: nanofiltration membrane prepared in Embodiment 1; Sample 2: nanofiltration membrane prepared in Embodiment 2; Sample 3: nanofiltration membrane prepared in Embodiment 3; Sample 4: nanofiltration membrane prepared in Comparative Example 1; Sample 5: nanofiltration membrane prepared in Comparative Example 2; and Sample 6: nanofiltration membrane prepared in Comparative Example 3.

Test I: test for pure water permeability

Test substances: Sample 1 to Sample 6

Test method: After pre-compacting each of the sample membranes at an operating pressure of 10 bar for 4 hours, the test was conducted under cross-flow filtration conditions with an operating pressure of 8 bar, a water temperature of 25° C., and a cross-flow rate of 20 cm/s. The effluent from each of the sample membranes was obtained within the same time period to measure the volume and then calculate the pure water permeability. The test results are shown in Table 1.

|  | Pure water permeability (LMH · bar$^{-1}$) |
| --- | --- |
| Sample 1 | 21.6 |
| Sample 2 | 39.5 |
| Sample 3 | 29.3 |
| Sample 4 | 17.2 |
| Sample 5 | 22.2 |
| Sample 6 | 26.6 |

It can be seen from Table 1 that the pure water permeabilities of Samples 1 to 3 are higher than that of Sample 4, indicating that the introduction of metal-organic framework in the nanofiltration membrane can increase the clean water permeability of the nanofiltration membrane. Moreover, the pure water permeability of Sample 2 is higher than that of Sample 1, indicating that the pure n water permeability of the nanofiltration membrane is affected by the concentration of the metal-organic framework added to it during the preparation process. In addition, the pure water permeabilities of Samples 2 and 3 are higher than those of Samples 5 and 6, indicating that the pure water permeability of the nanofiltration membrane is also related to the pore size of the metal-organic framework in the nanofiltration membrane.

Test II: test for rejection rates of different salts (NaCl, CaCl$_2$, and Na$_2$SO$_4$)

Test substances: Sample 1 to Sample 6

Test method: Each of the inorganic salt solutions had an ion concentration of 10 mmol/L and a pH of 7.2. The test was conducted under cross-flow filtration conditions with an operating pressure of 8 bar, a water temperature of 25° C., and a cross-flow rate of 20 cm/s. The water samples were taken from the influent and effluent of each of the sample membranes to measure the electrical conductivity. The test results are shown in Table 2.

| | Rejection rate (%) | | |
|---|---|---|---|
| | NaCl | CaCl$_2$ | Na$_2$SO$_4$ |
| Sample 1 | 30.6 | 75.8 | 64.3 |
| Sample 2 | 24.2 | 52.2 | 9.5 |
| Sample 3 | 27.1 | 63.0 | 12.5 |
| Sample 4 | 31.3 | 37.3 | 93.7 |
| Sample 5 | 30.3 | 46.3 | 96.9 |
| Sample 6 | 33.2 | 40.2 | 95.0 |

Figure 4:
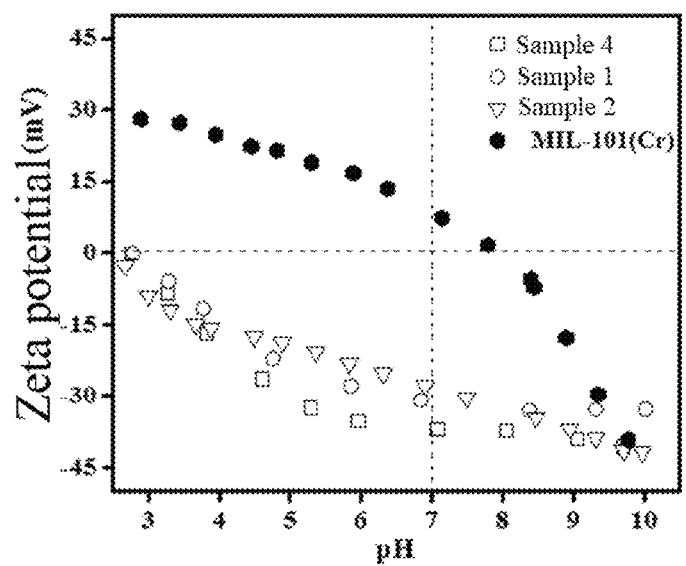
FIG. 4 is a diagram showing zeta potentials of Sample 1, Sample 2 and Sample 4, and 100 mg/L suspension of MIL-101(Cr) as a function of pH.

It can be seen from Table 2 that the rejection rates of calcium chloride by Samples 1 to 3 are significantly greater than those of Samples 4 to 6, while the rejection rates of sodium sulfate by Samples 1 to 3 are lower than those of Samples 4 to 6, indicating that the surface of the nanofiltration membrane prepared in each embodiment is dominated by positively charged channels. Based on this, the inventors further tested the zeta potentials of Sample 1, Sample 2, Sample 4, and 100 mg/L suspension of MIL-101 (Cr) as a function of pH. The results are shown in FIG. 4. FIG. 4 shows that the membrane surfaces of Sample 1, Sample 2, and Sample 4 are all negatively charged, while the surface of MIL-101(Cr) is positively charged. Therefore, in combination with the results in Table 2, it is shown that the separation performance of the nanofiltration membrane prepared in each embodiment of the present invention is dominated by the water channels of MIL-101(Cr).

Test III: test for rejection performance of hydrophobic endocrine disrupting chemicals Test substances: Sample 1 to Sample 6

Test method: Four endocrine disrupting chemicals were used, including H1 (methyl paraben), H2 (propyl paraben), H3 (benzyl paraben), and H4 (bisphenol A), and the concentration of each of the hydrophobic endocrine disrupting chemicals was 200 μg/L. After pre-adsorption and saturation for 10 hours, the test was conducted under cross-flow filtration conditions with an operating pressure of 8 bar, a water temperature of 25° C. and across-flow rate of 20 cm/s. Subsequently, the water samples were taken from the influent and effluent of each of the sample nanofiltration membranes to measure the concentrations of the endocrine disrupting chemicals by liquid chromatography-tandem triple quadrupole mass spectrometer. The test results are shown in Table 3 and Table 4.

TABLE 3

| | Rejection rate (%) | | | |
|---|---|---|---|---|
| | H1 | H2 | H3 | H4 |
| Sample 1 | 32.2 | 32.1 | 37.1 | 68.3 |
| Sample 2 | 47.4 | 45.9 | 51.1 | 79.8 |
| Sample 3 | 46.4 | 41.3 | 48.4 | 81.3 |
| Sample 4 | 27.7 | 25.2 | 31.3 | 64.9 |
| Sample 5 | 29.5 | 27.3 | 34.2 | 65.8 |
| Sample 6 | 31.2 | 30.3 | 35.6 | 67.9 |

TABLE 4

| | Selectivity for water/endocrine disrupting chemicals | | | |
|---|---|---|---|---|
| | H1 | H2 | H3 | H4 |
| Sample 1 | 0.060 | 0.059 | 0.078 | 0.278 |
| Sample 2 | 0.115 | 0.107 | 0.133 | 0.523 |
| Sample 3 | 0.108 | 0.092 | 0.113 | 0.541 |
| Sample 4 | 0.049 | 0.042 | 0.057 | 0.240 |

TABLE 4-continued

| | Selectivity for water/endocrine disrupting chemicals | | | |
|---|---|---|---|---|
| | H1 | H2 | H3 | H4 |
| Sample 5 | 0.053 | 0.049 | 0.063 | 0.248 |
| Sample 6 | 0.058 | 0.057 | 0.070 | 0.269 |

It can be seen from Tables 3 and 4 that the rejection rates of the four hydrophobic endocrine disrupting chemicals and the selectivity for water/EDCs by Samples 1 to 3 are higher than those of Sample 4, indicating that the introduction of the metal-organic framework in the nanofiltration membrane can improve the rejection rate of the hydrophobic endocrine disrupting chemicals (EDCs) by the nanofiltration membrane, and effectively improve the selectivity of the nanofiltration membrane for water/EDCs. In addition, the rejection rates of the four hydrophobic endocrine disrupting chemicals and the selectivity for water/EDCs by Sample 2 are higher than those of Sample 1, indicating that the rejection of the four hydrophobic endocrine disrupting chemicals by the nanofiltration membrane is affected by the concentration of the metal-organic framework added to the nanofiltration membrane during the preparation process. The rejection rates of the four hydrophobic endocrine disrupting chemicals and the selectivity for water/EDCs by Samples 2 and 3 are much higher than those of Samples 5 and 6, indicating that the rejection performance of the hydrophobic endocrine disrupting chemicals by the nanofiltration membrane is related to whether the separation performance (affected by the pore size) of the nanofiltration membrane is dominated by the metal-organic framework in the nanofiltration membrane.

It should be understood that the above specific description of the present invention is only used to illustrate the present invention and is not limited to the technical solutions described in the embodiments of the present invention. It should be understood by those of ordinary skill in the art that modifications or equivalent replacements can be made to the present invention to achieve the same technical effects, and all of the modifications and equivalent replacements fall into the protection scope of the present invention, as long as the needs of use are met.

What is claimed is:

1. A method for preparing a nanofiltration membrane with a high flux for selectively removing hydrophobic endocrine disrupting chemicals, comprising the following steps: immersing a first porous support layer into a first solution, removing excess droplets from a surface of the first porous support layer after taking the first porous support layer out of the first solution to obtain a second porous support layer, wherein the second porous support layer is provided with the first solution attached into pores of the second porous support layer, and then immersing the second porous support layer into a second solution for an interfacial polymerization reaction, followed by washing after a completion of the interfacial polymerization reaction to obtain the nanofiltration membrane, wherein the first solution is an aqueous solution containing a polyamine monomer and an acid binding agent, and the second solution is an organic solution containing an acid chloride monomer and a metal-organic framework with a metal center of aluminum, chromium or iron, the metal-organic framework with the metal center of aluminum, chromium or iron has a mass/volume percentage concentration of 0.2 wt/v % to 0.40 wt/v % in the second solution; and wherein the acid binding agent is a mixture of triethylamine and sodium hydroxide and the acid binding agent has a total mass percentage concentration of 0.2 wt % to 1.0 wt % in the first solution.

2. The method for preparing the nanofiltration membrane according to claim 1, wherein the metal-organic framework has a pore size ranging from 0.7 nm to 2.0 nm, and a ligand of the metal-organic framework is an organic ligand containing a carboxyl group.

3. The method for preparing the nanofiltration membrane according to claim 2, wherein the ligand is terephthalic acid or 2-aminoterephthalic acid.

4. The method for preparing the nanofiltration membrane according to claim 1, wherein the metal-organic framework is at least one selected from the group consisting of MIL-101(Cr), MIL-101(Al), MIL-53(Cr), and MIL-53(Al).

5. The method for preparing the nanofiltration membrane according to claim 1, wherein the polyamine monomer is at least one selected from the group consisting of piperazine, m-phenylenediamine and p-phenylenediamine, and the polyamine monomer has a mass percentage concentration of 0.5 wt % to 2.0 wt % in the first solution.

6. The method for preparing the nanofiltration membrane according to claim 1, wherein the triethylamine and the sodium hydroxide are present at a concentration ratio of 2 to 5.

7. The method for preparing the nanofiltration membrane according to claim 1, wherein the acid chloride monomer is at least one selected from the group consisting of trimesoyl chloride and terephthaloyl chloride, and the acid chloride monomer has a mass percentage concentration of 0.05 wt % to 0.3 wt % in the second solution.

8. The method for preparing the nanofiltration membrane according to claim 1, wherein the second solution is formed by dissolving the acid chloride monomer and the metal-organic framework in an organic solvent, followed by an ultrasonic blending, wherein the ultrasonic blending is performed with an ultrasonic intensity of 150 W to 500 W at a temperature of 10° C. to 40° C. for a time period of 0.5 hours to 2.0 hours.

9. The method for preparing the nanofiltration membrane according to claim 1, wherein the washing is specifically performed by drying the nanofiltration membrane in air for 1 to 3 minutes, and then soaking the nanofiltration membrane in n-hexane for 1 to 3 minutes, followed by soaking the nanofiltration membrane in water for 1 to 3 minutes.

10. A nanofiltration membrane prepared by the method for preparing the nanofiltration membrane according to claim 1.

11. The method for preparing the nanofiltration membrane according to claim 2, wherein the metal-organic framework is at least one selected from the group consisting of MIL-101(Cr), MIL-101(Al), MIL-53(Cr), and MIL-53(Al).

12. The method for preparing the nanofiltration membrane according to claim 3, wherein the metal-organic framework is at least one selected from the group consisting of MIL-101(Cr), MIL-101(Al), MIL-53(Cr), and MIL-53(Al).

13. The method for preparing the nanofiltration membrane according to claim 2, wherein the polyamine monomer is at least one selected from the group consisting of piperazine, m-phenylenediamine and p-phenylenediamine, and the polyamine monomer has a mass percentage concentration of 0.5 wt % to 2.0 wt % in the first solution.

14. The method for preparing the nanofiltration membrane according to claim 3, wherein the polyamine monomer is at least one selected from the group consisting of piperazine, m-phenylenediamine and p-phenylenediamine, and the polyamine monomer has a mass percentage concentration of 0.5 wt % to 2.0 wt % in the first solution.

15. The method for preparing the nanofiltration membrane according to claim 2, wherein the triethylamine and the sodium hydroxide are present at a concentration ratio of 2 to 5.

16. The method for preparing the nanofiltration membrane according to claim 3, wherein the triethylamine and the sodium hydroxide are present at a concentration ratio of 2 to 5.

17. The method for preparing the nanofiltration membrane according to claim 2, wherein the acid chloride monomer is at least one selected from the group consisting of trimesoyl chloride and terephthaloyl chloride, and the acid chloride monomer has a mass percentage concentration of 0.05 wt % to 0.3 wt % in the second solution.

18. The method for preparing the nanofiltration membrane according to claim 3, wherein the acid chloride monomer is at least one selected from the group consisting of trimesoyl chloride and terephthaloyl chloride, and the acid chloride monomer has a mass percentage concentration of 0.05 wt % to 0.3 wt % in the second solution.

19. The method for preparing the nanofiltration membrane according to claim 2, wherein the second solution is formed by dissolving the acid chloride monomer and the metal-organic framework in an organic solvent, followed by an ultrasonic blending, wherein the ultrasonic blending is performed with an ultrasonic intensity of 150 W to 500 W at a temperature of 10° C. to 40° C. for a time period of 0.5 hours to 2.0 hours.

20. The method for preparing the nanofiltration membrane according to claim 3, wherein the second solution is formed by dissolving the acid chloride monomer and the metal-organic framework in an organic solvent, followed by an ultrasonic blending, wherein the ultrasonic blending is performed with an ultrasonic intensity of 150 W to 500 W at a temperature of 10° C. to 40° C. for a time period of 0.5 hours to 2.0 hours.

* * * * *